United States Patent [19]
Wentworth et al.

[11] Patent Number: 5,590,232
[45] Date of Patent: Dec. 31, 1996

[54] OPTICAL PACKAGE AND METHOD OF MAKING

[75] Inventors: Robert M. Wentworth, Phoenix; David Galloway; Garland D. Cotney, both of Tempe; Brian A. Webb, Chandler, all of Ariz.

[73] Assignee: Motorola, Inc., Schaumburg, Ill.

[21] Appl. No.: 390,209

[22] Filed: Feb. 16, 1995

[51] Int. Cl.⁶ .................... G02B 6/00; G02B 6/36
[52] U.S. Cl. ................................................ 385/92
[58] Field of Search ...................... 385/88–93, 147, 385/95

[56] References Cited

U.S. PATENT DOCUMENTS

| | | | |
|---|---|---|---|
| 4,225,213 | 9/1980 | McBride, Jr. et al. | 385/92 |
| 4,357,072 | 11/1982 | Goodfellow et al. | 385/91 |
| 4,549,783 | 10/1985 | Schmachtenberg, III | 385/88 |
| 4,647,148 | 3/1987 | Katagiri | 385/92 |
| 4,826,272 | 5/1989 | Pimpinellae | 385/93 |
| 5,276,754 | 1/1994 | Blair et al. | 385/92 |
| 5,345,524 | 9/1994 | Lebby et al. | 385/92 |
| 5,345,530 | 9/1994 | Lebby et al. | 385/92 X |
| 5,416,870 | 5/1995 | Chun et al. | 385/92 X |
| 5,428,704 | 6/1995 | Lebby et al. | 385/92 |

*Primary Examiner*—Akm E. Ullah
*Attorney, Agent, or Firm*—Bruce Neel

[57] ABSTRACT

An optical package including a housing defining a mounting area with leads formed in the housing each having a first end in the mounting area and a second end external to the housing. A semiconductor die with photonic devices thereon is mounted in the mounting area and electrically connected to the leads. The active light areas of the photonic devices is accessible through the mounting area. Optical fiber alignment structure is mounted in the mounting area for receiving optical fibers and aligning the optical fibers with the active light areas of the photonic devices.

21 Claims, 5 Drawing Sheets

OPTICAL PACKAGE AND METHOD OF MAKING

FIELD OF THE INVENTION

The present invention pertains to optical interconnects and more specifically to apparatus for connecting photonic devices to optical fibers.

BACKGROUND OF THE INVENTION

Generally, in the area of data communication it is a well known fact that optical fibers have the capability of carrying many more signals and with a much broader bandwidth than copper or other hardwire systems. To communicate through optical fibers or optical data links, it is necessary to position an optical transmitter, such as a laser, light emitting diode, etc., at one end of the optical fiber and a light receiver, such as a light detector, light sensitive diode, etc., at the other end. Light transmitters and light receivers are generally referred to in the art as photonic devices.

To date, the major problem with optical fiber data links is the fabrication of photonic to optical fiber packages. Generally, it is desirable to include the photonic devices in electronic packages which utilize the electric signals and to have the ability to connect/disconnect a cable or ribbon of optical fibers between two electronic packages. For example, it is desirable to communicate data between peripherals and a computer, usually at as high a speeds as are possible.

In the past, many large and expensive connectors have been developed for connecting large optical cables to data terminals. Because these cables are used to carry data over very long paths (e.g. telephone communication), the expense and size of the connectors is not a factor compared to the expense and size of the overall system. However, when the object is to carry data a few meters or less between adjacent pieces of electronic equipment, the size and cost of the connectors at each end of the optical interconnect cable are a major portion of the cost of the cable.

Accordingly, it would be highly beneficial to be able to manufacture optical interconnect cables and connectors with a relatively small cost and size.

It is a purpose of the present invention to provide a new and improved optical package with standard semiconductor chip attachment.

It is another purpose of the present invention to provide a new and improved optical package which is small and easily disconnected from the optical cable.

It is yet another purpose of the present invention to provide a new and improved optical package which is simpler and less expensive to manufacture.

It is still another purpose of the present invention to provide a new and improved optical package which contains very few parts relative to some prior art packages and which uses relatively standard equipment (in the semiconductor industry) and components in the fabrication and assembly.

SUMMARY OF THE INVENTION

The above problems and others are at least partially solved and the above purposes and others are realized in an optical package including a housing defining a mounting area with leads formed in the housing each having a first end in the mounting area and a second end external to the housing. A semiconductor die with a photonic device thereon is mounted in the mounting area and electrically connected to the leads. The active light area of the photonic device is accessible through the mounting area. Optical fiber alignment structure is mounted in the mounting area for receiving an optical fiber and aligning the optical fiber with the active light area of the photonic device.

The above problems and others are at least partially solved and the above purposes and others are realized in a method of fabricating an optical package including the steps of forming a housing defining a mounting area with a plurality of leads positioned in the housing, each having an end in the mounting area and an end external to the housing, providing a semiconductor die including at least one photonic device with a plurality of electrical terminals and an active light area, mounting the semiconductor die on the housing in the mounting area with the active light area accessible through the mounting area and electrically connecting the terminals to the leads, and forming optical fiber alignment means for receiving an optical fiber and aligning the optical fiber with the active light area of the photonic device and mounting the optical fiber alignment means on the housing in the mounting area.

BRIEF DESCRIPTION OF THE DRAWINGS

Referring to the drawings.

DESCRIPTION OF THE PREFERRED EMBODIMENT

Figure 1:
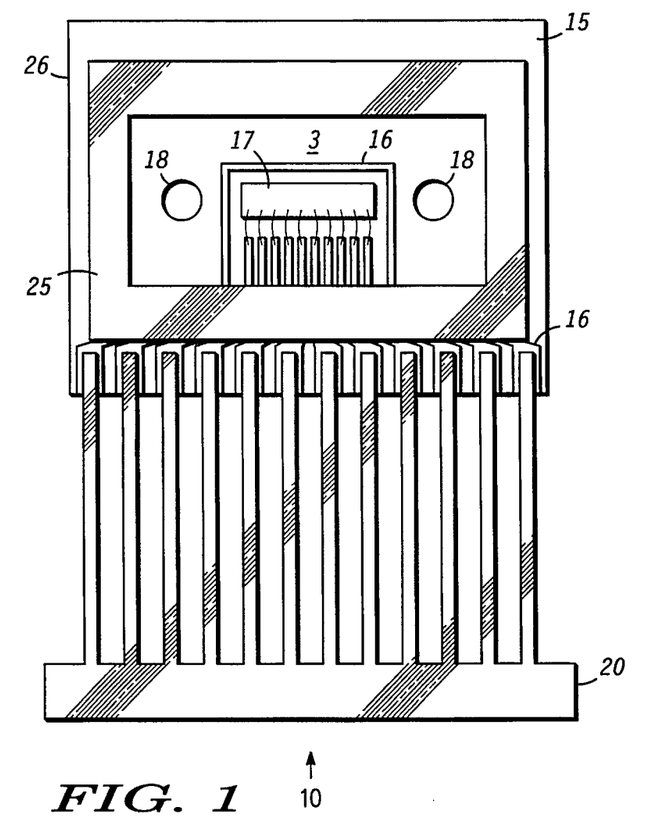
FIG. 1 is a view in top plan of a portion of an optical package embodying the present invention.

Referring specifically to FIG. 1, a view in top plan of a portion of an optical package 10 embodying the present invention is illustrated. The portion of optical package 10 illustrated in FIG. 1 includes a substrate 15, a lead frame 20 and a generally rectangularly shaped collar 25. In this embodiment, substrate 15 has a plurality of electrical traces, or leads, 16 formed on the surface thereof and lead frame 20 is physically and electrically bonded to leads 16 by any of the convenient methods known and utilized in the semiconductor industry, such as soldering, spot welding, brazing, etc. Leads 16 also define an area on which a semiconductor die 17 including one or more photonic devices is mounted. Each photonic device in semiconductor die 17 includes electrical terminals which are connected to leads 16 by means of a common wire bonder.

Rectangularly shaped collar 25 is positioned on substrate 15 so as to encircle semiconductor die 17 and to provide areas 18 which are free of electrical leads and which will receive alignment pins to be explained presently. Substrate 15 and collar 25 cooperate to form a housing 26 defining a mounting area 3 therein. It should be noted that in this embodiment, mounting area 3 is a cavity, but it may be a surface, a substrate, etc. It will of course be understood by those skilled in the art that housing 26 and mounting area 3 can be formed utilizing other processes, such as molding or the like. Further, if housing 26 is formed by molding, leads 16 and leadframe 20 could be molded into housing 26 as a single unit.

Figure 2:
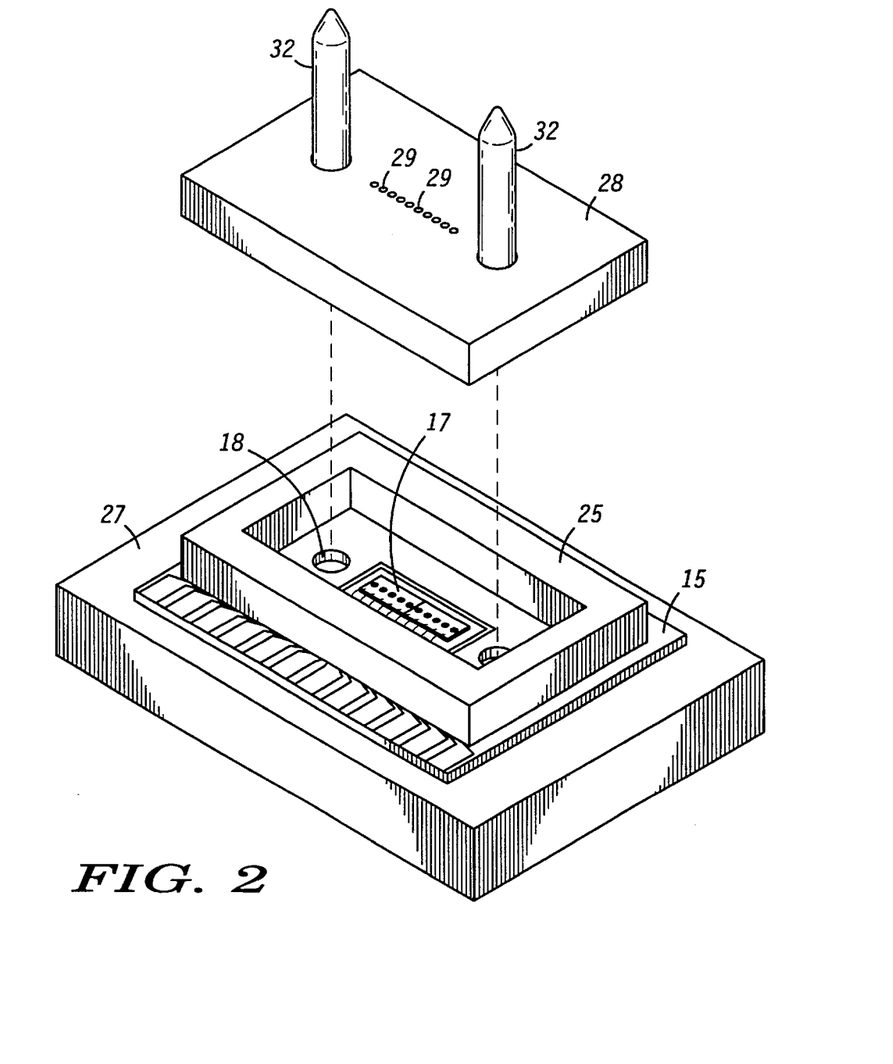
FIG. 2 is a simplified, or semi-schematic, perspective view of a step in the assembly of an optical package utilizing the portion of FIG. 1.
Figure 3:
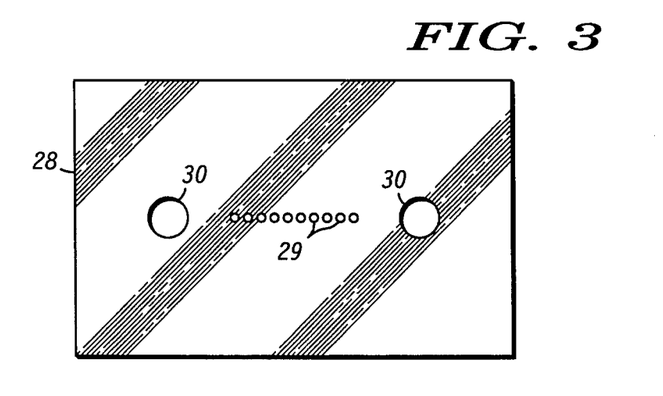
FIG. 3 is a view in bottom plan of a portion of the apparatus of FIG. 2.

Utilizing a standard precision die bonder (e.g. an RDI Bonder), the structure described in conjunction with FIG. 1 is positioned on a lower chuck 27, as illustrated semi-schematically in FIG. 2. An upper alignment fixture 28 is provided. Fixture 28 includes a plurality or line of holes 29 therethrough (see FIG. 3), one for each photonic device in semiconductor chip 17 and spaced apart so as to coincide with an active light area for each photonic device on semiconductor chip 17. Fixture 28 also includes two larger holes 30, one positioned at each end of the line of holes 29, and each constructed to receive an elongated alignment pin 32 (see FIG. 2) positioned therein.

Figure 4:
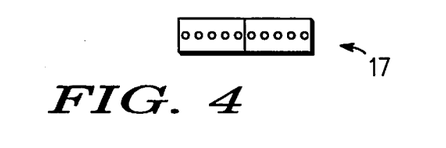
FIG. 4 is a top view of laser die as seen from the assembly apparatus utilized in the step of FIG. 2.

In the present assembly procedure using the precision die bonder, pins 32 are placed in holes 30 and the precision die bonder features are utilized to align holes 29 with the active light areas of the photonic devices, which appear generally as illustrated in FIG. 4. Holes 29 may also be replaced with target fiducials in fixture 28, as will be understood by those skilled in the art of die bonder operations. As alignment of fixture 28 with die 17 is achieved, the die bonder raises chuck 27 to within some predetermined distance (in this embodiment approximately 0.002 inches) from fixture 28. Alignment pins 32 are then pushed through openings 30 into abutting engagement with the surface of substrate 27. Pins 32 are now accurately aligned with respect to the active light areas of the photonic devices on semiconductor die 17.

Mounting area 3 is filled with a curable plastic, such as epoxy or the like to fix pins 32 in the aligned position. In most applications the curable plastic will not only surround and hold the lower ends of pins 32 but will cover semiconductor die 17 and leads 16. When the curable plastic covers semiconductor die 17, it is desirable that the curable plastic be a material that cures optically clear so that light can travel freely therethrough to and/or from the active light areas of the photonic devices. Further, in some applications the depth of mounting area 3 may not be sufficient to ruggedly fix pins 32 in the aligned position. In such applications it may be convenient and/or desirable to form deeper depressions or holes at areas 18, with a substantially larger diameter than pins 32, to receive pins 32 therein. Thus, when mounting area 3 and the deeper depressions are filled with plastic, the mechanical mounting of pins 32 will be substantially enhanced. Generally, the curable plastic material filling mounting area 3 is cured by heating substrate 15, or use of ultra-violet light, or some other convenient method.

Figure 5:
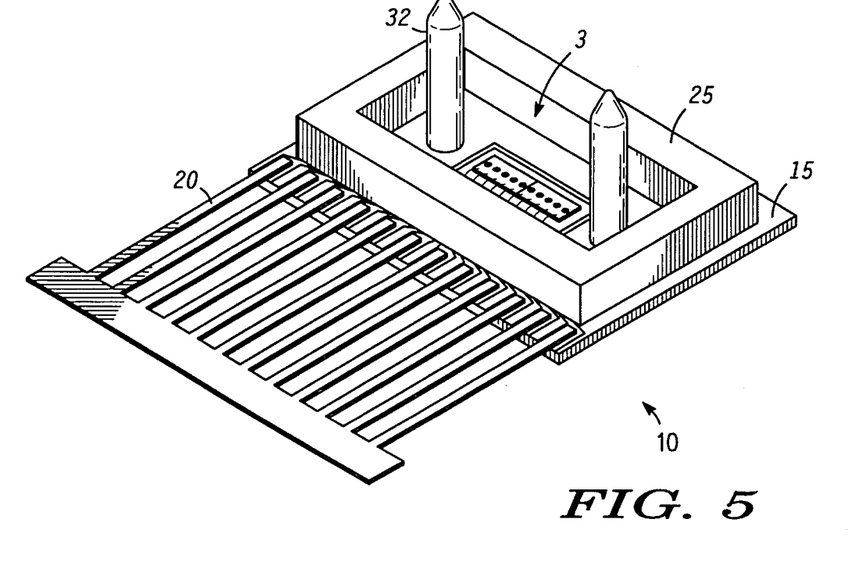
FIG. 5 is an enlarged perspective view of the partially assembled optical package.
Figure 6:
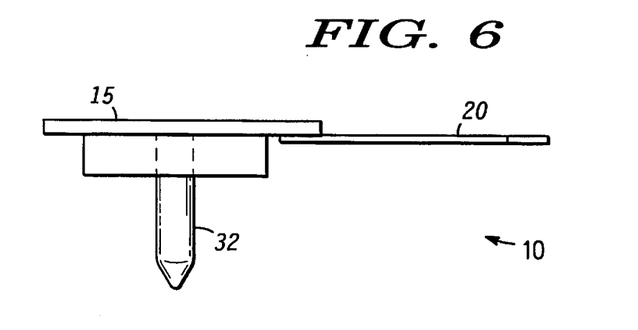
FIG. 6 is a view in side elevation of the optical package of FIG. 5.

Referring to FIGS. 5 and 6, perspective and side elevational views are illustrated, respectively, of a substantially completed optical package 10. In these figures, lead frame 20 has not been trimmed, or the leads formed into the final configuration. Also, some additional encapsulation may be provided if desired or deemed advantageous. Generally, however, optical package 10 is ready to be mounted in a piece of electronic equipment with the leads (once trimmed and formed) electrically attached as data inputs/outputs.

To connect a fiber optic cable or ribbon to optical package 10, one simply uses a standard connector (not shown), such as the well known MT Connector, attached to a fiber optic cable or ribbon. Alignment pins 32 are positioned to engage alignment sockets in the standard connector, and the end of each optical fiber in the fiber optic cable or ribbon will be accurately aligned with the active optic areas of the photonic device in chip 17. It will of course be understood that alignment sockets could be substituted for alignment pins 32 so that a male optical connector, rather than a female optical connector, can be removably connected therewith.

Figure 7:
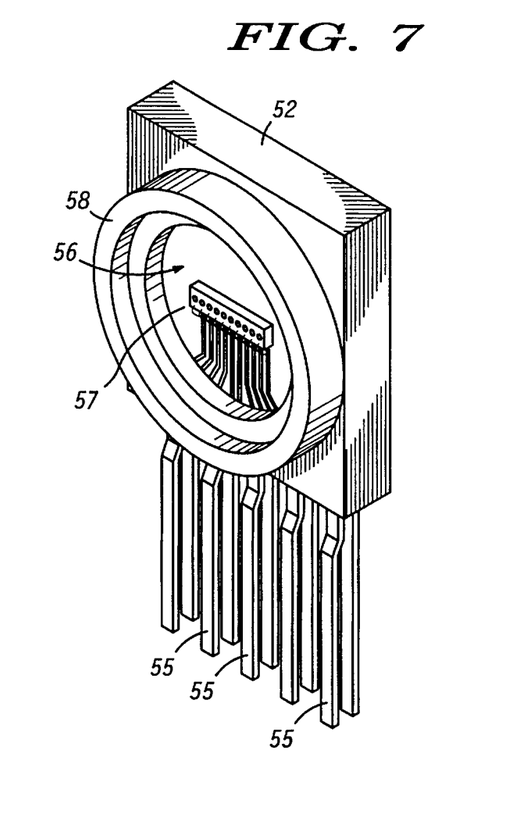
FIGS. 7 and 8 are perspective views of different portions of another optical package embodying the present invention.

Referring to FIGS. 7–11, another embodiment of an optical package 50 constructed in accordance with the present invention is illustrated. A housing 52 is formed, as illustrated in FIG. 7, including a plurality of leads 55 and a mounting area 56. As described in conjunction with the previous embodiment, housing 52 can be formed by providing a substrate with electrical traces or leads formed thereon and a leadframe attached thereto or by simply molding housing 52 with a single leadframe positioned therein. If housing 52 is formed from a substrate, semiconductor die 57, including one or more photonic devices, is mounted on the surface of the substrate and electrically connected to the leads. A ring shaped collar 58 is then fixedly mounted on the surface of the substrate surrounding the semiconductor die and defining mounting area 56. If housing 52 is molded, mounting area 56 is defined in the surface with ends of the leads exposed therein. The semiconductor die is then bonded in the mounting area.

Figure 8:
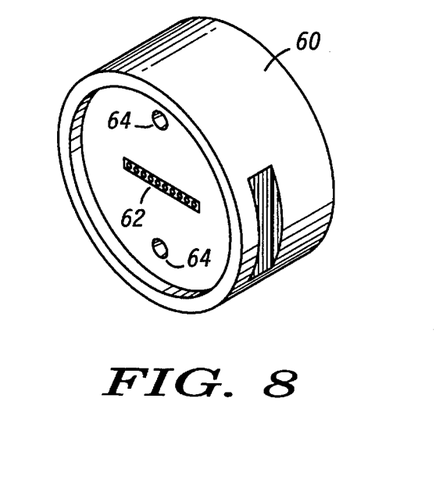

An insert 60 is formed as illustrated in FIG. 8, having a cross-section which matches, but is smaller, than mounting area 56. Generally, insert 60 has a substantially cylindrical cross-section (circular in this specific embodiment, however it may be rectangular, etc.) with a first end formed to fit into mounting area 56 and a second end extending outwardly externally to mounting area 56. Also, insert 60 includes a section of fiber optic ribbon 62 positioned therein with a first end in the first end of insert 60 and a second end in the second end of insert 60. Fiber optic ribbon 62 is cut and polished at each end to form an optical input/output.

A pair of alignment sockets (or holes) 64 are formed in the second end of insert 60 and adapted to receive alignment pins of a standard optical connector, such as the well known MT Connector or the like. In this specific embodiment, insert 60 is molded with fiber optic ribbon 62 extending therethrough and alignment sockets 64 aligned with fiber optic ribbon 62 so that a male optical connector with alignment pins engaged in alignment sockets 64 is accurately aligned with fiber optic ribbon 62. It will of course be understood that alignment pins could be substituted for, or engaged permanently in, alignment sockets 64 so that a female optical connector can be removably connected therewith.

Also, in this embodiment insert 60 can be constructed as a modal noise filter to substantially prevent ambient or unwanted light from entering the system and to reduce cross-talk between channels. A variety of different engineering concepts can be designed into the modal noise filter to prevent or reduce certain types of interference that may be prevalent in different application. For example, by precisely forming the length of fiber optic ribbon 62, light reflection from semiconductor die 57 returned into the optic link can be minimized.

Figure 9:
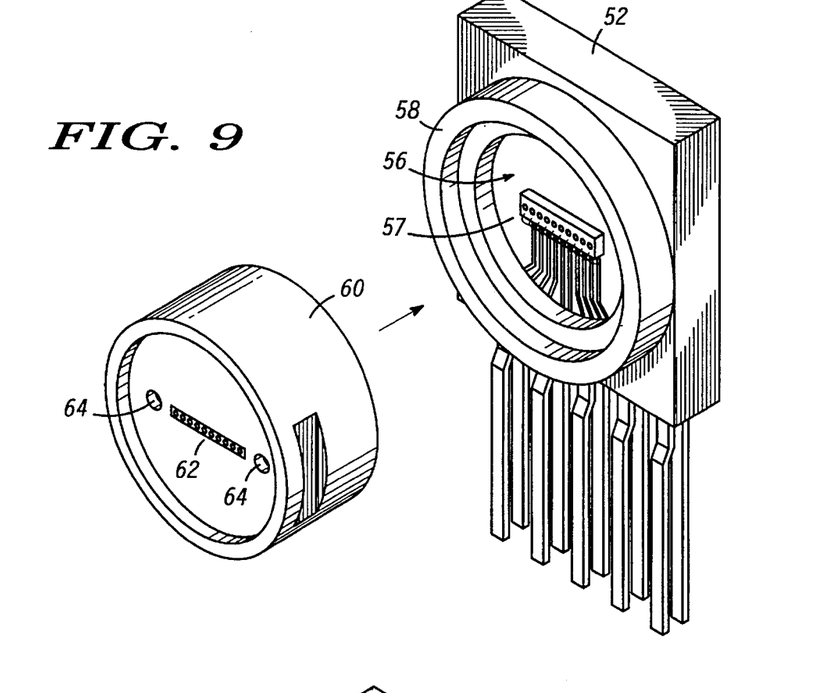
FIG. 9 is a perspective view illustrating the assembly of the portions illustrated in FIGS. 7 and 8.

In a preferred embodiment as shown specifically in FIG. 9, the plurality of optical fibers in fiber optic ribbon 62 extend in a line substantially parallel to a line through the axes of alignment sockets 64. This provides the advantage of requiring alignment with only one optical fiber, rather than an entire line of optical fibers, the spaces there between and any variations therein. It should be noted that the position of sockets 64 in FIG. 9 differs from that in FIGS. 7, 8, 10, and 11 to illustrate this preferred embodiment.

In the assembly procedure, illustrated generally in FIG. 9, insert 60 is positioned in mounting area 56 so that fiber optic ribbon 62 is substantially aligned with the active light areas of the photonic devices in semiconductor die 57. Alignment of fiber optic ribbon 62 with the active light areas can be performed with a precision die bonder, generally as described in conjunction with the previous embodiment, by accurate indexing, or by a technique known as active alignment. In active alignment, light is directed into the external end of each of the optical fibers in fiber optic ribbon 62 and sensed at semiconductor die 57, or vice versa. Insert 60 is then moved within mounting area 56 until the maximum light indication is achieved.

Figure 10:
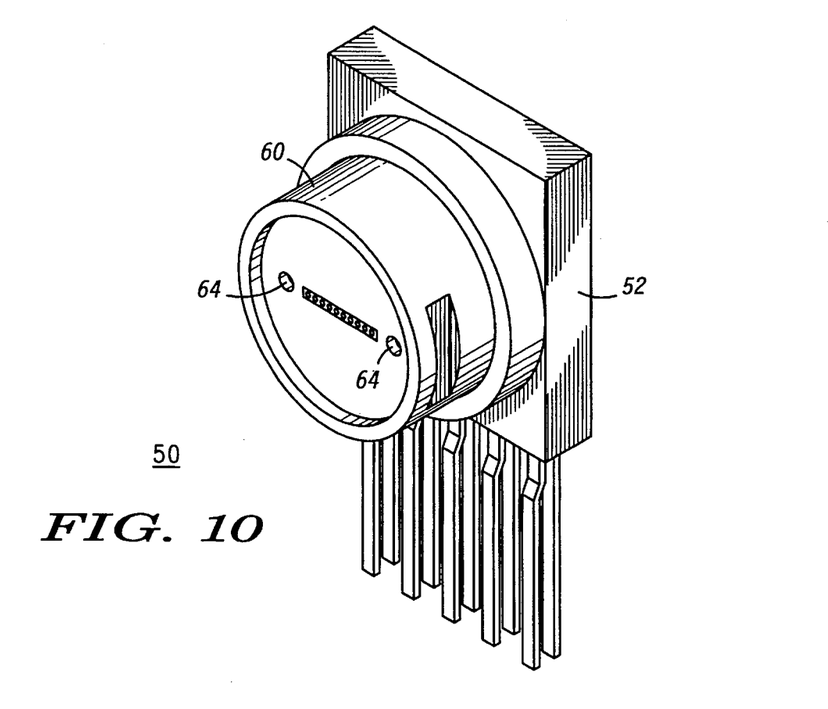
FIG. 10 is a perspective view of the portions illustrated in FIGS. 7 and 8 assembled into an optical package embodying the present invention.
Figure 11:
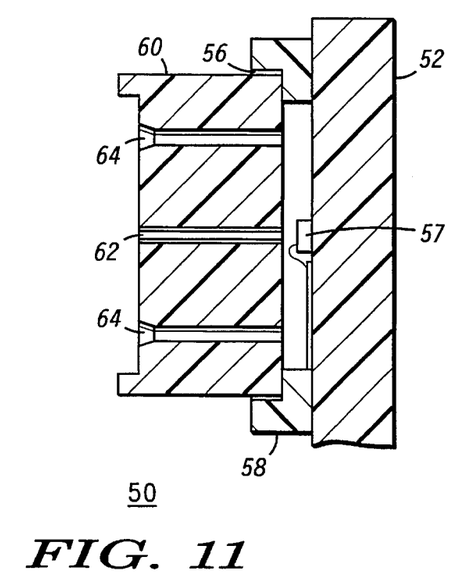
FIG. 11 is an enlarged sectional view of the optical package illustrated in FIG. 10.

Once fiber optic ribbon 62 is properly aligned with the active light areas of the photonics devices on semiconductor die 57, an adhesive such as epoxy or the like is introduced into mounting area 56 around insert 60 and appropriately cured so as to fix insert 60 in the aligned position, generally as illustrated in FIGS. 10 and 11. It should be understood that the adhesive could be preapplied and cured by U.V., heat, etc. By sealing insert 60 tightly in mounting area 56, no extraneous light can enter optical package 50 and the alignment of the various components is retained.

Generally, optical package 50 is ready to be mounted in a piece of electronic equipment with the leads electrically attached as data inputs/outputs. To connect a fiber optic cable or ribbon to optical package 50, one simply uses a standard connector (not shown), such as the well known MT Connector, attached to a fiber optic cable or ribbon. Alignment sockets 64 are positioned to engage alignment pins in the standard male connector, and the end of each optical fiber in the fiber optic cable or ribbon of the standard connector will be accurately aligned with the active optic areas of the photonic device in die 57. As explained previously, alignment pins could be substituted for, or engaged permanently in, alignment sockets 64 so that a female optical connector can be removably connected therewith if desired.

Figure 12:
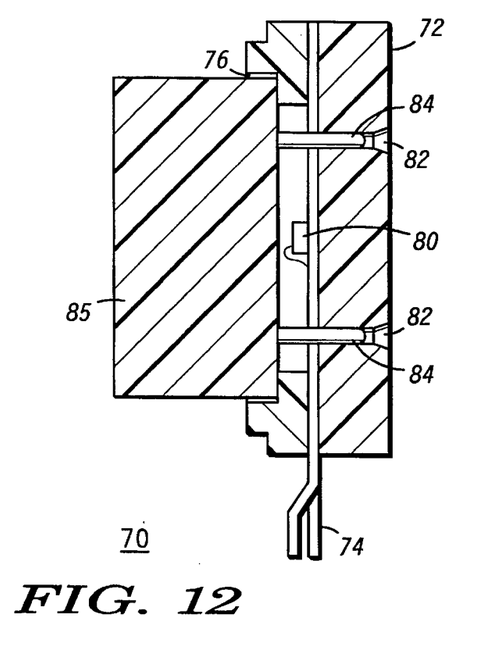
FIG. 12 is an enlarged sectional view, similar to FIG. 11, of another embodiment of an optical package embodying the present invention.

Referring specifically to FIG. 12, a slightly different embodiment of an optical package 70 is illustrated. In this embodiment a housing 72 with leads 74 positioned (molded, etc.) therein, defines a mounting area 76, generally by any of the methods previously described. In this embodiment a semiconductor die 80 is positioned in mounting area 76, as previously described, and a pair of alignment sockets 82 are formed in housing 72 adjacent to and aligned with semiconductor die 80. Alignment sockets 82 can be formed and aligned using any of the techniques previously described for aligning other components, including but not limited to molding.

Generally, optical package 70 is ready to be mounted in a piece of electronic equipment with the leads electrically attached as data inputs/outputs. To connect a fiber optic cable or ribbon to optical package 70, one simply uses a standard connector, such as the well known MT Connector (a male connector 85 is illustrated in the engaged position in FIG. 12), attached to a fiber optic cable or ribbon. Alignment sockets 82 are positioned to engage alignment pins 84 in standard male connector 85, and the end of each optical fiber in standard connector 85 is accurately aligned with the active optic areas of the photonic device in semiconductor chip 80. Again, alignment pins could be substituted for, or engaged permanently in, alignment sockets 82 so that a female optical connector can be removably connected therewith, rather than male connector 85, if desired.

Thus, a new and improved optical package is provided, which optical package is small and easily disconnected from the optical cable. Further, the new and improved optical package is simpler and less expensive to manufacture. Also, the new and improved optical package contains very few parts relative to some prior art packages and uses relatively standard equipment (in the semiconductor industry) and components in the fabrication and assembly.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. An optical package comprising:
   a housing defining a mounting area with a plurality of leads formed in the housing, each lead having a first end extending into the mounting area and a second end extending externally from the housing;
   a semiconductor die including at least one photonic device with a plurality of electrical terminals, the semiconductor die being mounted on the housing in the mounting area with the plurality of electrical terminals electrically connected to the plurality of leads, and the photonic device further having an active light area positioned to be optically accessible through the mounting area in the housing; and
   optical fiber alignment means mounted on the housing in the mounting area for receiving at least one optical fiber and aligning the received optical fiber with the active light area of the photonic device.

2. An optical package as claimed in claim 1 wherein the optical fiber alignment means includes at least two alignment pins fixed to the housing in the mounting area and aligned to the active light area of the photonic device, the two alignment pins extending outwardly from the mounting area for engaging mating alignment sockets in an optical fiber connector.

3. An optical package as claimed in claim 1 wherein the optical fiber alignment means includes at least two alignment sockets formed in the housing in the mounting area and aligned to the active light area of the photonic device, the two alignment sockets extending into the housing for engaging mating alignment pins in an optical fiber connector.

4. An optical package as claimed in claim 1 wherein the optical fiber alignment means includes an insert engaged in the mounting area in the housing, the insert including at least one optical fiber formed in the insert and having a first end optically aligned with the active light area of the photonic device and a second end positioned in an external surface of the insert, the insert further including alignment sockets aligned to the at least one optical fiber for engaging mating alignment pins in an optical fiber connector.

5. An optical package as claimed in claim 4 wherein the insert is formed as a cylinder with the first end of the optical fiber positioned at one end of the cylinder and the second end of the optical fiber positioned at a second end of the cylinder.

6. An optical package as claimed in claim 5 wherein the semiconductor die includes a plurality of photonic devices spaced along a line and the cylinder includes a fiber optic ribbon having a plurality of optical fibers.

7. An optical package as claimed in claim 6 wherein the cylinder is molded from plastic and the fiber optic ribbon is molded into the cylinder.

8. An optical package as claimed in claim 7 wherein the cylinder includes a pair of spaced apart alignment sockets and the fiber optic ribbon extends in a line substantially parallel to a line through the alignment sockets.

9. An optical package comprising:
   a housing defining a substantially circular mounting area with a plurality of leads formed in the housing, each lead having a first end extending into the mounting area and a second end extending externally from the housing;
   a semiconductor die including at least one photonic device with a plurality of electrical terminals, the semiconductor die being mounted on the housing in the mounting area with the plurality of electrical terminals electrically connected to the plurality of leads, and the photonic device further having an active light area positioned to be optically accessible through the mounting area in the housing; and
   a cylindrically shaped insert having a first end engaged in the mounting area in the housing and a second end positioned externally to the mounting area, the insert including a fiber optic ribbon with a plurality of optical fibers positioned in parallel and in a line, the fiber optic ribbon having a first end positioned at the first end of the cylinder and a second end positioned at the second end of the cylinder with the first end of the fiber optic ribbon optically aligned with the active light area of the photonic device and the second end of the fiber optic ribbon positioned in an external surface of the insert, the insert further including alignment sockets in the second end and aligned to the fiber optic ribbon for engaging mating alignment pins in an optical fiber connector, and the fiber optic ribbon extending in a line substantially parallel to a line through the alignment sockets.

10. A method of fabricating an optical package comprising the steps of:
    forming a housing defining a mounting area with a plurality of leads positioned in the housing, each lead having a first end extending into the mounting area and a second end extending externally from the housing;
    providing a semiconductor die including at least one photonic device with a plurality of electrical terminals and an active light area;
    mounting the semiconductor die on the housing in the mounting area with the active light area positioned to be optically accessible through the mounting area in the housing and electrically connecting the plurality of electrical terminals to the plurality of leads; and
    forming optical fiber alignment means for receiving at least one optical fiber and aligning the received optical fiber with the active light area of the photonic device and mounting the optical fiber alignment means on the housing in the mounting area.

11. A method of fabricating an optical package as claimed in claim 10 wherein the step of forming a housing defining a mounting area with a plurality of leads positioned in the housing includes molding the housing from plastic and molding leads in the plastic.

12. A method of fabricating an optical package as claimed in claim 10 wherein the step of molding the housing from plastic and molding leads in the plastic includes molding a lead frame in the plastic.

13. A method of fabricating an optical package as claimed in claim 12 wherein the step of electrically connecting the plurality of electrical terminals to the plurality of leads includes wire bonding the electrical terminals to the lead frame.

14. A method of fabricating an optical package as claimed in claim 10 wherein the step of forming optical fiber alignment means includes positioning at least two alignment pins in the housing in the mounting area and aligning the two pins to the active light area of the photonic device, further positioning the two alignment pins in the mounting area so as to extend outwardly from the mounting area for engaging mating alignment sockets in an optical fiber connector, and fixing the positioned pins in the mounting area.

15. A method of fabricating an optical package as claimed in claim 10 wherein the step of forming optical fiber alignment means includes forming at least two alignment sockets in the housing in the mounting area and aligning the two alignment sockets to the active light area of the photonic device, the two alignment sockets being further formed to extend into the housing for engaging mating alignment pins in an optical fiber connector.

16. A method of fabricating an optical package as claimed in claim 10 wherein the step of forming optical fiber alignment means includes forming an insert with a first and a second end and engaging the first end of the insert in the mounting area in the housing, the insert being formed to include at least one optical fiber having a first end positioned in the first end of the insert and a second end positioned in the second end of the insert, and the second end of the insert further having alignment sockets formed therein and aligned to the at least one optical fiber for engaging mating alignment pins in an optical fiber connector.

17. A method of fabricating an optical package as claimed in claim 16 wherein the step of forming an insert with a first end includes forming the insert slightly smaller than the mounting area, and the step of engaging the first end of the insert in the mounting area includes the steps of positioning the first end of the insert in the mounting area, moving the first end of the insert in the mounting area to optically align the at least one optical fiber with the active light area of the photonic device and fixing the insert in the mounting area with the at least one optical fiber aligned with the active light area of the photonic device.

18. A method of fabricating an optical package as claimed in claim 17 wherein the step of forming an insert includes forming the insert in the shape of a cylinder with the optical fiber extending therethrough and the first end of the optical fiber being positioned at one end of the cylinder and the second end of the optical fiber being positioned at a second end of the cylinder.

19. A method of fabricating an optical package as claimed in claim 18 wherein the step of providing a semiconductor die includes providing a semiconductor die having a plurality of photonic devices thereon spaced along a line and the step of forming the insert in the shape of a cylinder with the optical fiber extending therethrough includes forming the insert in the shape of a cylinder with a fiber optic ribbon having a plurality of optical fibers.

20. A method of fabricating an optical package as claimed in claim 19 wherein the step of forming the insert in the shape of a cylinder includes molding the cylinder from plastic and molding the fiber optic ribbon into the cylinder.

21. A method of fabricating an optical package as claimed in claim 20 wherein the step of forming the insert in the shape of a cylinder includes molding the cylinder with a pair of spaced apart alignment sockets and positioning the fiber optic ribbon so as to extend in a line substantially parallel to a line through the alignment sockets.

* * * * *